US010203229B2

(12) United States Patent
Deom

(10) Patent No.: US 10,203,229 B2
(45) Date of Patent: Feb. 12, 2019

(54) POINTERLESS INSTRUMENT CLUSTER GAUGE

(71) Applicant: Continental Automotive Systems, Inc., Auburn Hills, MI (US)

(72) Inventor: David Pineda Deom, Tiajomulco de Zuniga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 33 days.

(21) Appl. No.: 14/250,611

(22) Filed: Apr. 11, 2014

(65) Prior Publication Data

US 2015/0291091 A1 Oct. 15, 2015

(51) Int. Cl.

*F21V 11/00* (2015.01)
*G01D 11/28* (2006.01)
*B60K 35/00* (2006.01)

(52) U.S. Cl.

CPC .............. *G01D 11/28* (2013.01); *B60K 35/00* (2013.01)

(58) Field of Classification Search

CPC ............ B60K 37/02; B60K 2350/1064; B60K 2350/408; B60K 2350/1072; B60K 2350/2052; B60K 2350/403; B60K 35/00; G01D 13/265; G01D 11/28; Y10S 116/05; B60Q 3/04; B60Q 1/068; B60Q 1/076; F21S 48/1742; F21V 14/02

USPC ......... 362/23.01; 116/43, 44, 47, 48, 49, 51, 116/62.1, 201, 241; 368/80

See application file for complete search history.

(56) References Cited

U.S. PATENT DOCUMENTS 2,058,939 A * 10/1936 Arey ......................... 324/154 R
3,270,831 A * 9/1966 Woofter ................. B60K 37/02 180/90
3,988,059 A * 10/1976 Johnson ........................ 353/122
4,034,549 A * 7/1977 Danley et al. .................. 368/79
4,036,009 A * 7/1977 Sampson ............... G04B 19/00 368/233
5,353,735 A 10/1994 Arai et al.
6,352,357 B1 * 3/2002 Woolard ....................... 362/277
6,379,015 B2 * 4/2002 Wilhelm et al. ............. 362/23.2
7,520,241 B2 * 4/2009 Pala ....................... B60K 37/02 116/288
7,928,859 B1 4/2011 Li et al.
2003/0189819 A1 * 10/2003 Furuya ................... G01D 13/28 362/23.2
2006/0062004 A1 * 3/2006 Birman ......................... 362/487
2010/0083894 A1 * 4/2010 Birman et al. ................ 116/288
2011/0182052 A1 * 7/2011 Frens ..................... B60K 37/02 362/23.21
2011/0203512 A1 * 8/2011 Baker .......................... 116/284

FOREIGN PATENT DOCUMENTS

FR 2945117 * 11/2010
KR 101490946 B1 * 2/2015 ............... B60Q 3/04

* cited by examiner

*Primary Examiner* — Evan Dzierzynski
*Assistant Examiner* — Omar Rojas Cadima

(57) ABSTRACT

A pointerless instrument cluster utilizes a light source and a focal component to project a light image onto a gauge face plate, thereby projecting an image of a pointer onto the gauge.

2 Claims, 2 Drawing Sheets

120
140
130
142
100
132
114
110
112

POINTERLESS INSTRUMENT CLUSTER GAUGE

TECHNICAL FIELD

The present disclosure is related generally to instrument clusters for vehicles, and more specifically to a pointerless gauge for use in the same.

BACKGROUND OF THE INVENTION

Operation of motor vehicles requires the operator to monitor multiple conditions of the engine and the vehicle. For example, in a manual gear shift vehicle, the operator may benefit from having access to the revolutions per minute (RPMs) of the engine and the speed of the vehicle at all times. Furthermore, it can also be desirable to provide alternate information, such as engine temperature in addition to the mandatory information described above.

To present this information, vehicles typically include an instrument cluster located in a position that is easily viewable from the operator's position. The instrument cluster includes multiple gauges, with each gauge indicating information related to one or more of the above described conditions. Each gauge has a pointer affixed to a center of the gauge, and the pointer rotates to indicate corresponding information such as vehicle speed.

SUMMARY OF THE INVENTION

Disclosed is an instrument cluster for a vehicle having: at least one gauge including a face plate, a sliding component disposed along at least one edge of said face plate, a light source mounted to said rotatable ring, a focal component mounted between the light source and the faceplate, and wherein the light source and the focal component combine to cast a light image on the face plate.

Also disclosed is one gauge including a face plate, a rotatable ring disposed about said face plate, a light source mounted to said rotatable ring, a focal component mounted between the light source and the faceplate, and wherein the light source and the focal component combine to cast a light image on the face plate.

Also disclosed is a method of displaying information including the step of projecting a light image onto a gauge faceplate of a pointerless gauge, wherein the light image identifies a subsection of a gauge marking portion of the gauge faceplate.

DETAILED DESCRIPTION OF AN EMBODIMENT

Figure 1:
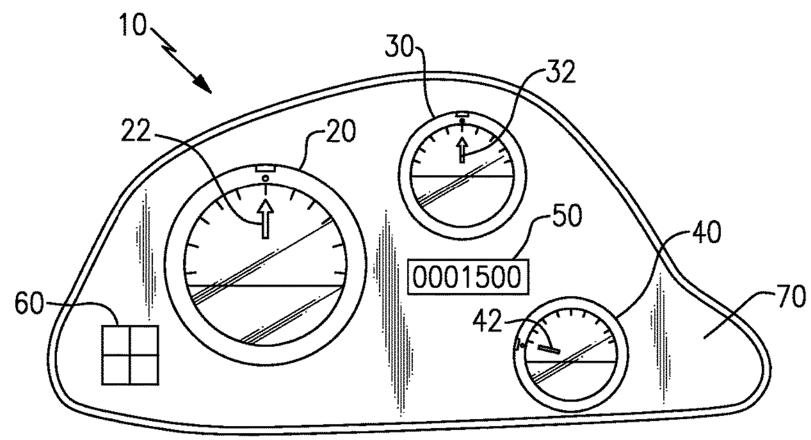
FIG. 1 illustrates an instrument cluster for a vehicle.

FIG. 1 illustrates an instrument cluster 10. The instrument cluster 10 includes a speedometer 20, a tachometer 30, and a temperature gauge 40. Also included in the instrument cluster 10 are multiple engine condition indicators 60 and an odometer 50. In alternate examples, the gauges 20, 30, 40 can be located in different configurations and additional gauges can be included or omitted. A lens 70 covers the instrument cluster 10. The lens 70 is smoked, or otherwise tinted, to allow only a portion of light through the lens 70. By allowing only a portion of light through the lens 70, and ensuring that the instrument lights are sufficiently bright within the instrument cluster 10, ambient light such as daylight is prevented from washing out the gauges and making them difficult or impossible to read by an operator during high ambient light conditions.

Each of the gauges 20, 30, 40 within the instrument cluster 10 is a pointerless gauge. Standard gauges of the prior art utilize physical pointers connected to the centers of face plates. The pointers rotate and point at gauge indicators to convey corresponding information. The pointerless gauges 20, 30, 40 of FIG. 1, however, do not have physical pointer components. Instead, light images 22, 32, 42 is projected onto the face plates of gauges 20, 30, 40.

An alternate example of instrument cluster 10 utilizes a combination of standard gauges and pointerless gauges in place of all pointerless gauges to convey necessary information while simultaneously achieving a desired aesthetic effect.

Figure 2:
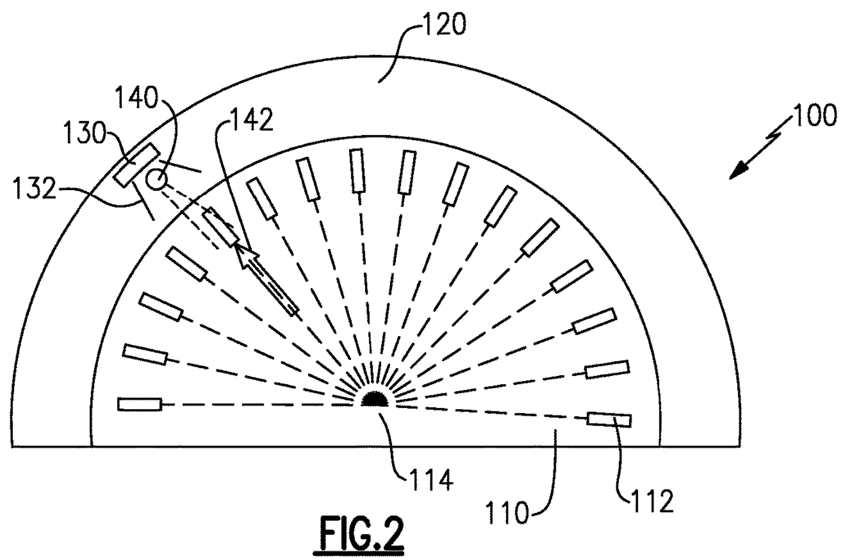
FIG. 2 illustrates an example pointerless gauge.

FIG. 2 illustrates a single pointerless gauge 100 such as could be used in the example instrument cluster 10 of FIG. 1. The pointerless gauge 100 includes a face plate 110. The face plate 110 has a gauge marking region 112 with hash marks, numbers, or other similar gauge indicators and a face plate center 114. A rotatable ring 120 is disposed about the face plate 110. The rotatable ring 120 is connected to a sensor output by a gearing such that the rotatable ring 120 rotates about the face plate 110 as the sensor readings change.

Mounted to the rotatable ring 120 is a light source 130 and a focal component 140. The light source 130 shines light 132 radially inward toward the face plate center 114. The focal component 140 interacts with the light 132 to project an image 142 on the face plate 110. The projected image 142 identifies a portion of the gauge marking region 112, thereby providing information to the operator of the vehicle in which the gauge 100 is located.

The focal component 140 has a fixed position relative to the light source 130. The light source 130 and the focal component 140 rotate along with the rotatable ring 120, causing the projected image 142 to rotate and point to the correct portion of the gauge marking region 112 corresponding to the connected sensor information. Due to the fixed position of the focal component 140 relative to the light source 130, the image 142 projected onto the face plate 110 remains constant as the rotatable ring 120 rotates about the face plate 110.

The example embodiment illustrated in FIG. 2 uses a wide spectrum LED as the light source 130, however, alternate light sources 130 such as red-green-blue (RGB) LEDs can also be used to the same effect. The focal component 140 can be a clear prism or an opaque shadow casting component depending on a desired light image effect. The focal component 140 can also be interchangeable to alter or replace the projected image.

Figure 3:
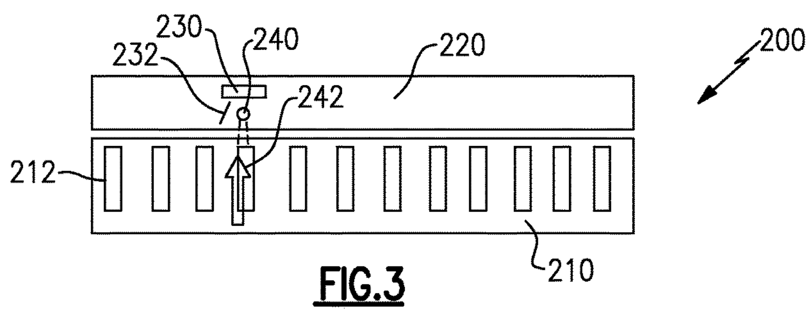
FIG. 3 illustrates an alternate example pointerless gauge.

FIG. 3 illustrates an example pointerless gauge 200 that functions similar to the pointerless gauge of FIG. 2. The pointerless gauge 200 illustrated in FIG. 3 is rectangular instead of circular and includes a face plate 210 with a slider 220 mounted above the face plate 210. A light source 230 and a focal component 240 are mounted on the slider 220 in a fixed position relative to each other. The focal component 240 is between the light source 230 and the face plate 210. The focal component 240 interacts with the light 232 from the light source 230 to project an image onto the face plate 210 as in the example of FIG. 2. Slider 220 is connected to a sensor arrangement and shifts horizontally causing the light source 230, the focal component 240, and the projected image 242 to also shift horizontally. In an alternate configuration, the slider 220 can be located below the face plate 210 and operated similarly.

Figure 4A:
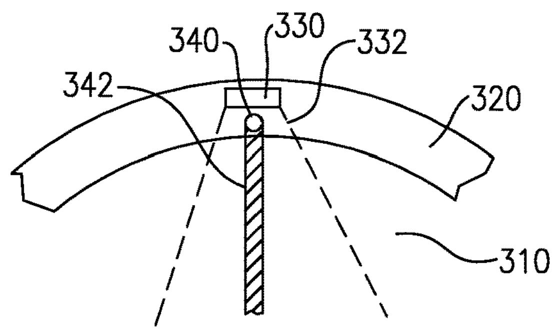
FIG. 4A illustrates an example pointerless gauge including a shadow casting focal component.
Figure 4B:
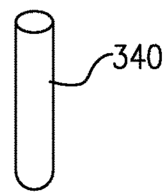
FIG. 4B illustrates an example shadow casting focal component.
Figure 4C:
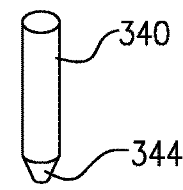
FIG. 4C illustrates an alternate example shadow casting focal component.

In each of the examples of FIGS. 2 and 3, the focal components 140, 240 are either shadow casting components or a prism focusing lights. FIG. 4A illustrates an example arrangement where a focal component 340 is a shadow casting component 340. FIGS. 4B and 4C illustrate example focal components 340 that can be used in the example of FIG. 4A.

In the example of FIGS. 4A-C, a light source 330 emits wide spectrum light toward the center of the face plate 310. The focal component 340 is positioned between the light source 330 and the center of the face plate 310 and blocks a portion of the emitted light 332. This light blocking casts a shadow 342 on the face plate 310. The shape of the shadow 342 corresponds to a cross section of the focal component 340, thereby allowing the projected shadow 342 to be a desired shape. The shadow 342 illustrated in FIG. 4A is a simple line shadow 342 corresponding to a cylindrical or rectangular post such as the cylindrical post shaped focal component 340 illustrated in FIG. 4B.

Alternate focal component 340 cross sections can achieve alternate projected shapes due to the different cross section. The focal component 340 of example 4C creates an arrow shaped shadow 342, with the shadow 342 pointing at a radially outward edge of the face plate 310. The arrow shape of the shadow 342 is achieved by tapering a bottom section 344 of the focal component 340 inward, thus reducing the width of the shadow 342 projected by the base of the focal component 340.

As described above, the focal components 340 can be removed and replaced to change the shadow projected onto the face plate 310 without requiring a full replacement of the gauge or the instrument cluster.

Figure 5:
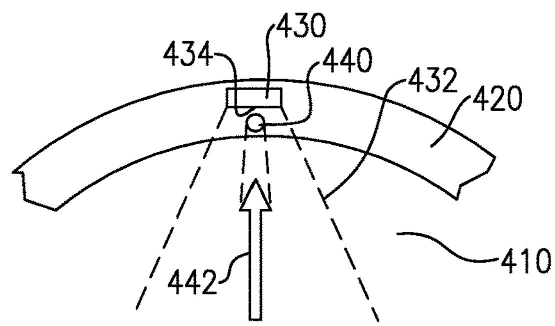
FIG. 5 illustrates an example pointerless gauge including a prism based focal component.

FIG. 5 illustrates an alternate configuration utilizing a clear prism for the focal component 440. As with the example of FIGS. 4A through 4C, the focal component 440 is positioned in the path of the light 432 emitted from the light source 440. Since the prism 440 is clear, a portion 434 of the light 432 passes through the prism 440 and is focused into a specific shape and projected onto the face plate 310 as an image 442. The prism 440 can be cut, shaped, and positioned according to known prism 440 design techniques to achieve a desired light image 442 shape. The illustrated projected image 442 is an arrow, however, it is understood that various alternate light image shapes can be utilized instead, by replacing the illustrated prism 442 with a different prism.

In further prism examples, the prism 440 can be colored and can color the light image 442 projected onto the face plate. Alternately, the prism 440 can be colorless and the light source 430 can be a RGB LED, thereby allowing for color changes during operation of the vehicle. The color changes can provide additional functionality of notifying the operator when the vehicles functioning in excess of a threshold such as a temperature threshold. This additional functionality is achieved by changing the color of the LED when the threshold is exceeded, thereby changing the color of the projected light image 442.

Although an embodiment of this invention has been disclosed, a worker of ordinary skill in this art would recognize that certain modifications would come within the scope of this invention. For that reason, the following claims should be studies to determine the true scope and content of this invention.

The invention claimed is:

1. A pointerless instrument cluster gauge comprising:

a substantially round faceplate having a center point and a peripheral edge, the substantially round faceplate also having a plurality of gauge indicators located on the faceplate such that the gauge indicators are adjacent the peripheral edge;

a rotatable annulus adjacent to and circumscribing the peripheral edge of the substantially round faceplate, the rotatable annulus further comprising:

a light source attached to and rotating with the rotatable annulus, the light source being configured to emit light toward the center point of the substantially round faceplate;

a focal component attached to and rotating with the rotatable annulus, the focal component being located on the annulus relative to the light source such that the focal component is between the light source and the center point of the substantially round faceplate;

wherein the light source, focal component and rotatable annulus are configured to project a shadow over a first gauge indicator that is located between the focal component and the center point of the substantially round faceplate, the shadow projected over the first gauge indicator being movable to a second, different location and to a second and different gauge indicator by rotation of the rotatable annulus around the center point of the substantially round faceplate.

2. The pointerless instrument cluster gauge of claim 1, wherein the focal component is a prism.

* * * * *